(12) United States Patent
Tang

(10) Patent No.: US 7,957,075 B2
(45) Date of Patent: Jun. 7, 2011

(54) OPTICAL LENS SYSTEM FOR TAKING IMAGE

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 542 days.

(21) Appl. No.: 12/038,806

(22) Filed: Feb. 27, 2008

(65) Prior Publication Data

US 2009/0153982 A1    Jun. 18, 2009

(30) Foreign Application Priority Data

Dec. 18, 2007 (TW) .................................. 96148511 A

(51) Int. Cl.
G02B 13/18 (2006.01)
G02B 3/12 (2006.01)
G02B 3/14 (2006.01)

(52) U.S. Cl. .......................... 359/716; 359/785; 359/790

(58) Field of Classification Search .......... 359/713–716, 359/785, 790
See application file for complete search history.

(56) References Cited

U.S. PATENT DOCUMENTS

| | | | |
|---|---|---|---|
| 7,236,314 B2 * | 6/2007 | Liao | 359/784 |
| 7,372,643 B1 * | 5/2008 | Li et al. | 359/784 |
| 7,423,817 B2 * | 9/2008 | Nakanishi | 359/716 |
| 2004/0179274 A1 * | 9/2004 | Amanai | 359/785 |

* cited by examiner

Primary Examiner — Scott J Sugarman

(57) ABSTRACT

An optical lens system for taking image consisting of from the object side to the image side: an aperture stop; a first lens element with positive refractive power having a convex object-side surface and a concave image-side surface; a second lens element with negative refractive power having a concave object-side surface and a convex image-side surface, at least one of the object-side and the image-side surfaces of the second lens element being aspheric; and a third lens element with positive refractive power having a convex object-side surface and a convex image-side surface, at least one of the object-side and the image-side surfaces of the third lens element being aspheric.

17 Claims, 4 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements:

from the object side to the image side: a first lens element with positive refractive power, a second lens element with negative refractive power and a third lens element with positive refractive power, such as the optical lens system for taking image described in U.S. Pat. No. 7,145,736. However, a third lens element described in this patent is meniscus, and such a meniscus shape will generally limit the refractive power of the third lens element. So in order to provide the refractive power required by the optical lens system, the refractive power of the first lens element must be increased. As a result, the sensitivity of the optical lens system will be increased comparatively. An optical lens system for taking image which uses lens elements made of glass and plastic is described in U.S. Pat. No. 6,490,102, wherein the third lens element is a spherical glass lens element. The use of the spherical lens element reduces the degrees of freedom available for correcting the off-axis aberration of the optical lens system, making it more difficult to control image quality. An optical lens system for taking image described in U.S. Pat. No. 7,262,925 comprises three lens elements with refractive power. An aperture stop is located between the first lens element and the second lens element, such that the optical lens system requires a relatively long total track length, which results in a relatively large mechanical structure, so that the requirement of miniaturization can not be satisfied.

The present invention mitigates and/or obviates the aforementioned disadvantages.

SUMMARY OF THE INVENTION

The primary objective of the present invention is to improve image quality, and effectively reduce the volume of the optical lens system while considering the ease of manufacture of the lens elements. The present invention provides a whole new three-lens type optical lens system.

An optical lens system for taking image in accordance with the present invention comprises: in order from the object side to the image side: an aperture stop; a first lens element with positive refractive power having a convex object-side surface and a concave image-side surface; a second lens element with negative refractive power having a concave object-side surface and a convex image-side surface, at least one of the object-side surface and the image-side surface of the second lens element being aspheric; a third lens element with positive refractive power having a convex object-side surface and a convex image-side surface, at least one of the object-side surface and the image-side surface of the third lens element being aspheric.

In the present optical lens system for taking image, the first lens element supplies the required refractive power to the optical lens system. The second lens element with negative refractive power corrects the chromatic aberration. The third lens element with positive refractive power balances and distributes the refractive power of the first lens element, so as to reduce the sensitivity of the optical lens system and to correct the aberration caused by the optical lens system. The convex object-side surface and the convex image-side surface of the third lens element can improve the refractive power and can contribute to a better correction of the incident angle of the off axis light with respect to the sensor. Such arrangements can effectively improve image quality.

By alternating lens elements with positive and negative refractive powers, the total track length of the optical lens system can be effectively reduced. The first lens element provides a positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. With the miniaturization of the optical lens system, the focal length of the optical lens system is becoming very short, such that the correction of the spherical aberration becomes less important. Using a meniscus first lens element with a front aperture stop, the astigmatism caused by the optical lens system can be corrected effectively. And inflection points are formed on the object-side surface of the third lens element to contribute to a better correction of the incident angle of the off axis light with respect to the sensor.

In the present optical lens system for taking image, the lens elements can be made of glass or plastic. The lens elements are provided with aspheric surfaces, allowing more design parameters (than spherical surfaces), so as to better reduce the aberration and the number of the lens elements, thus effectively reducing the total track length of the optical lens system.

In the present optical lens system for taking image, an object to be photographed is imaged on an electronic imaging sensor, the total track length of the system is TTL, the image height of the system is ImgH, add they satisfy the relation:

$TTL/\text{Img}H < 2.35$.

The above relation can maintain the objective of miniaturization of the optical lens system for taking image.

In the present optical lens system for taking image, the Abbe number of the second lens element is V2, and it satisfies the relation:

$V2 < 32$.

The above relation can effectively correct the chromatic aberration caused by the system, and improve the resolution of the system. And it will be better if the Abbe number V2 of the second lens element satisfies the relation:

$V2 < 28$.

Further, it will be much better and the resolution of the system can be much improved if the Abbe number V2 of the second lens element satisfies the relation:

$V2 < 25$.

In the present optical lens system for taking image, the refractive index of the first lens element is N1, the refractive index of the third lens element is N3, and they satisfy the relations:

$1.54<N1<1.6;$ $1.52<N3<1.6.$

If the refractive indices of the first lens element and the third lens element satisfy the above relation, the plastic optical material with the refractive index within the above range will better match the optical lens system.

In the present optical lens system for taking image, the focal length of the optical lens system for taking image is f, the focal length of the first lens element is f1, and they satisfy the relation:

$0.8<f/f1<1.5.$

If the value of f/f1 is smaller than the above lower limit, the refractive power of the system will be weak, the total track length of the system will be too long, and it will be difficult to suppress the incident angle of the light with respect to the sensor. And if the value of f/f1 is greater than the above upper limit, the high order aberration of the system will be difficult to correct. Further, it will be better if f/f1 satisfies the relation:

$0.9<f/f1<1.25.$

In the present optical lens system for taking image, the focal length of the optical lens system for taking image is f, the focal length of the third lens element is f3, and they satisfy the relation:

$0.5<f/f3<1.5.$

If the value of f/f3 is smaller than the above lower limit, the back focal length of the system will be too long, and this will be counter to the objective of miniaturization of the system. And if the value of f/f3 is greater than the above upper limit, the back focal length of the optical lens system will be too short, and this will result in insufficient space at the rear end of the system for mechanical design considerations. Further, it will be better if f/f3 satisfies the relation:

$1.0<f/f3<1.45.$

The third lens element with positive refractive power distributes the refractive power of the optical lens system, and it will be better if f1/f3 satisfies the relation:

$1.0<f1/f3<1.5.$

In the present optical lens system for taking image, the on-axis distance between the first lens element and the second lens element is T12, the center thickness of the second lens element is CT2, and they satisfy the relation:

$1.5<T12/CT2<4.0.$

The above relation will be better to correct the aberration of the system. Further, it will be better if T12/CT2 satisfies the relation:

$2.5<T12/CT2<4.0.$

In the present optical lens system for taking image, the center thickness of the second lens element is CT2, the focal length of the optical lens system for taking image is f, and they satisfy the relations:

$CT2<0.4$ mm, $CT2/f<0.25.$

The above relations can effectively reduce the total track length of the system.

In the present optical lens system for taking image, an incident angle of chief rays corresponding to the maximum image height onto the electronic imaging sensor is CRA (Chief Ray Angle), half of the maximal field of view is HFOV, and they satisfy the relation:

$0.5<\tan(CRA)/\tan(HFOV)<1.15.$

The above relation can make the optical lens system compatible with the electronic imaging sensor while obtaining a wide field of view.

In the present optical lens system for taking image, the radius of curvature of the object-side surface of the first lens element is R1, the radius of curvature of the image-side surface of the first lens element is R2, and they satisfy the relation:

$0.1<R1/R2<0.5.$

If the value of R1/R2 is smaller than the above lower limit, it will be difficult to correct the astigmatism caused by the system. And if the value of R1/R2 is greater than the above upper limit, it will be difficult to correct the spherical aberration caused by the system.

In the present optical lens system for taking image, the radius of curvature of the object-side surface of the third lens element is R5, the radius of curvature of the image-side surface of the third lens element is R6, and they satisfy the relation:

$-0.15<R5/R6<-0.01.$

The above relation is favorable to correct the high order aberration of the system.

In the present optical lens system for taking image, the tangential angle of the image-side surface of the third lens element at the position of its effective optical diameter is ANG32, and it satisfies the relation:

$ANG32<-20$ deg.

The above relation can effectively reduce the incident angle of the off axis light with respect to the sensor, and allow better correction of the off-axis aberration of the system.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

The present invention will become more obvious from the following description when taken in connection with the accompanying drawings, which show, for purpose of illustration only, the preferred embodiments in accordance with the present invention.

DETAILED DESCRIPTION OF THE PREFERRED EMBODIMENTS

Figure 1:
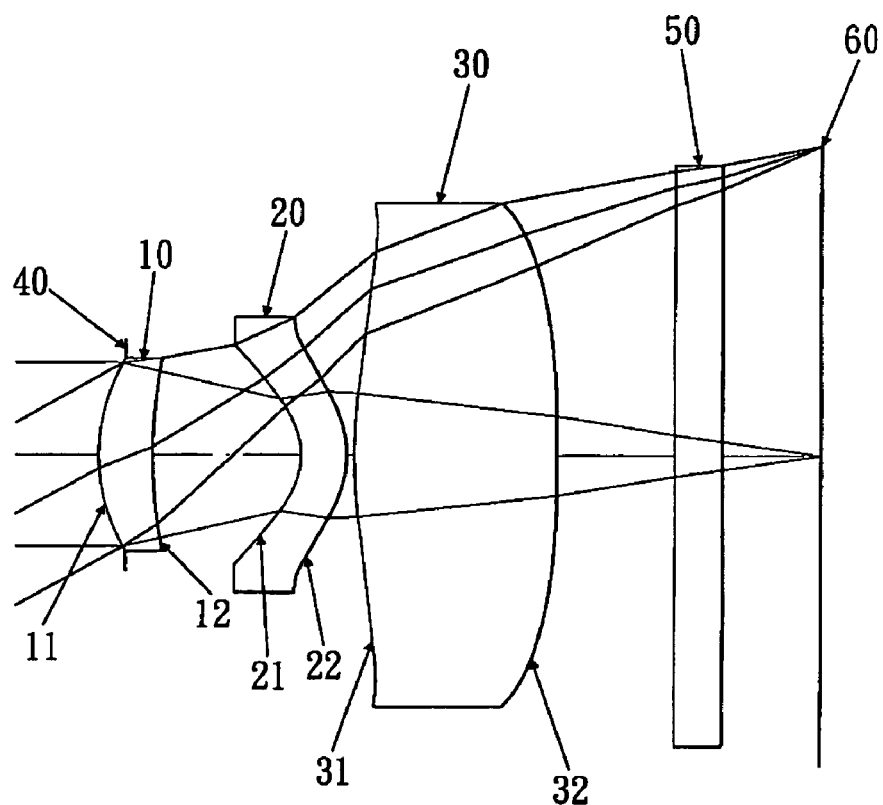
FIG. 1 shows an optical lens system for taking image in accordance with a first embodiment of the present invention.
Figure 2:
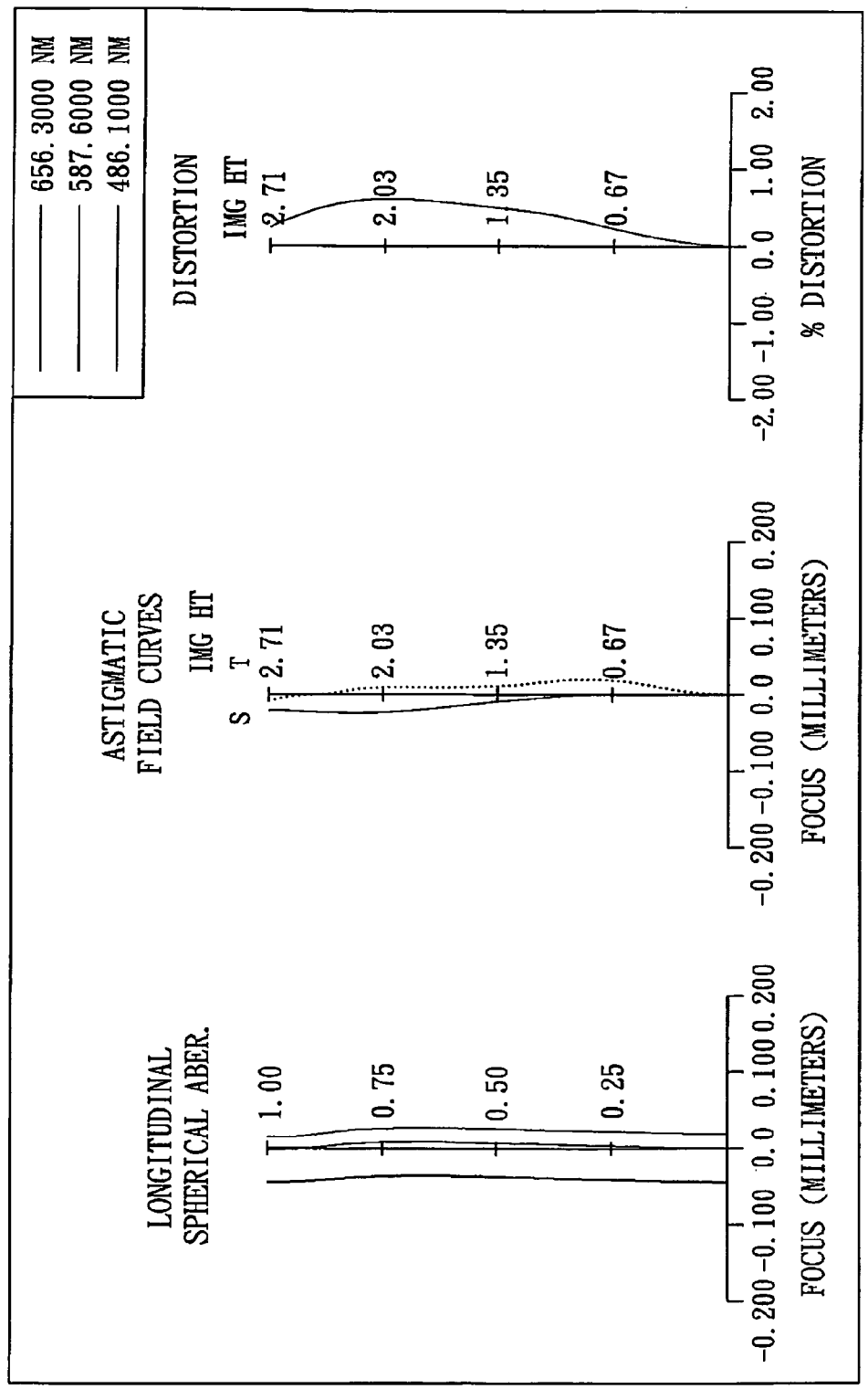
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with a first embodiment of the present invention comprises: in order from the object side to the image side:

An aperture stop 40.

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a convex image-side surface 32, the object-side surface 31 and the image-side surface 32 are aspheric, and inflection points are formed on the object-side surface 31.

An IR cut filter 50 is located behind the third lens element 30.

An image plane 60 is located behind the IR cut filter 50.

The equation for the aspheric surface profiles of the first embodiment is expressed as follows:

$$X(Y) = (Y^2/R)/(1 + sqrt(1-(1+k)*(Y/R)^2)) + \sum_{i}(Ai)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the third lens element is f3, and they satisfy the relations:

f=4.88 mm;

f/f1=1.15;

f/f3=0.75;

f1/f3=0.65.

In the first embodiment of the present optical lens system for taking image, the refractive index of the first lens element is N1, the refractive index of the third lens element is N3, and they satisfy the relations:

N1=1.543;

N3=1.530.

In the first embodiment of the present optical lens system for taking image, the Abbe number of the second lens element is V2, and it satisfies the relation:

V2=23.4.

In the first embodiment of the present optical lens system for taking image, the radius of curvature of the object-side surface of the first lens element is R1, the radius of curvature of the image-side surface of the first lens element is R2, and they satisfy the relation:

R1/R2=0.34.

In the first embodiment of the present optical lens system for taking image, the radius of curvature of the object-side surface of the third lens element is R5, the radius of curvature of the image-side surface of the third lens element is R6, and they satisfy the relation:

R5/R6=−0.07.

In the first embodiment of the present optical lens system for taking image, the center thickness of the second lens element is CT2, the focal length of the optical lens system for taking image is f, and they satisfy the relations:

CT2=0.392 mm;

CT2/f=0.08.

In the first embodiment of the present optical lens system for taking image, the on-axis distance between the first lens element and the second lens element is T12, the center thickness of the second lens element is CT2, and they satisfy the relation:

T12/CT2=3.20.

In the first embodiment of the present optical lens system for taking image, the tangential angle of the image-side surface of the third lens element at the position of its effective optical diameter is ANG32, and it satisfies the relation:

ANG32=−42.5 deg.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the first embodiment of the present optical lens system for taking image, the incident angle of chief rays corresponding to the maximum image height onto the electronic imaging sensor is CRA (Chief Ray Angle), half of the maximal field of view is HFOV, and they satisfy the relation:

tan(CRA)/tan(HFOV)=0.59.

In the first embodiment of the present optical lens system for taking image, the total track length of the optical lens system for taking image is TTL, the maximum image height of the optical lens system for taking image is ImgH, and they satisfy the relation:

TTL/ImgH=2.29.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f (focal length) = 4.88 mm, Fno = 3.0, HFOV (half of field of view) = 29.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.224 | | | | |
| 2 | Lens 1 | 1.60677(ASP) | 0.546 | Plastic | 1.543 | 56.5 | 4.22 |
| 3 | | 4.72570(ASP) | 1.254 | | | | |
| 4 | Lens 2 | −0.67121(ASP) | 0.392 | Plastic | 1.632 | 23.4 | −6.18 |
| 5 | | −0.99378(ASP) | 0.070 | | | | |
| 6 | Lens 3 | 3.65890(ASP) | 1.700 | Plastic | 1.530 | 55.8 | 6.5 |
| 7 | | −50.00000(ASP) | 1.000 | | | | |
| 8 | IR-filter | Plano | 0.400 | Glass | 1.517 | 64.2 | |
| 9 | | Plano | 0.827 | | | | |
| 10 | Image | Plano | | | | | |

TABLE 2

Aspheric Coefficients

| | Surface # | | | | | |
|---|---|---|---|---|---|---|
| | 2 | 3 | 4 | 5 | 6 | 7 |
| k = | −4.80209E−01 | 0.00000E+00 | −1.82721E+00 | −1.39957E+00 | −2.35772E+01 | 0.00000E+00 |
| A4 = | 2.42094E−02 | 1.05299E−02 | −2.26338E−01 | 5.79501E−03 | −7.88940E−03 | −2.54999E−02 |
| A6 = | 5.54097E−03 | −2.38629E−03 | 4.00880E−01 | 8.30761E−02 | 1.53280E−03 | 5.21931E−03 |
| A8 = | 6.68612E−03 | | −4.45249E−01 | −1.80444E−02 | −1.19956E−03 | −1.31101E−03 |
| A10 = | | | 3.52195E−01 | 1.86474E−03 | 3.80059E−04 | 1.11021E−04 |
| A12 = | | | −1.55149E−01 | | −3.92340E−05 | 3.62034E−06 |
| A14 = | | | | | | −1.01772E−06 |

Figure 3:
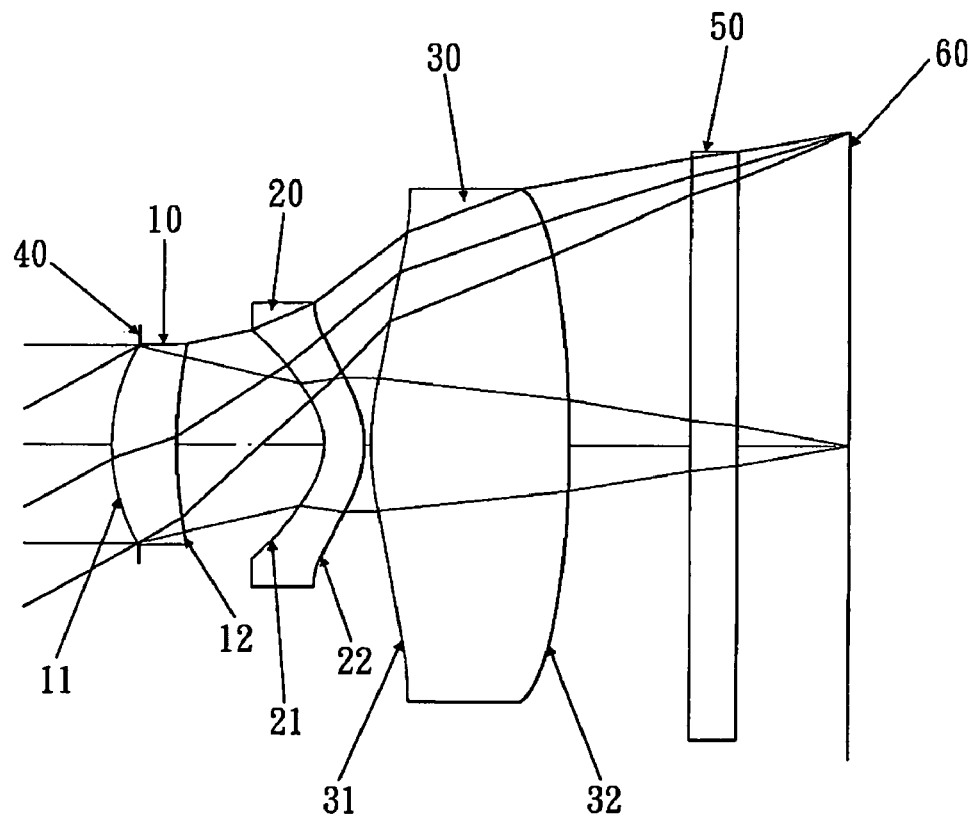
FIG. 3 shows an optical lens system for taking image in accordance with a second embodiment of the present invention.
Figure 4:
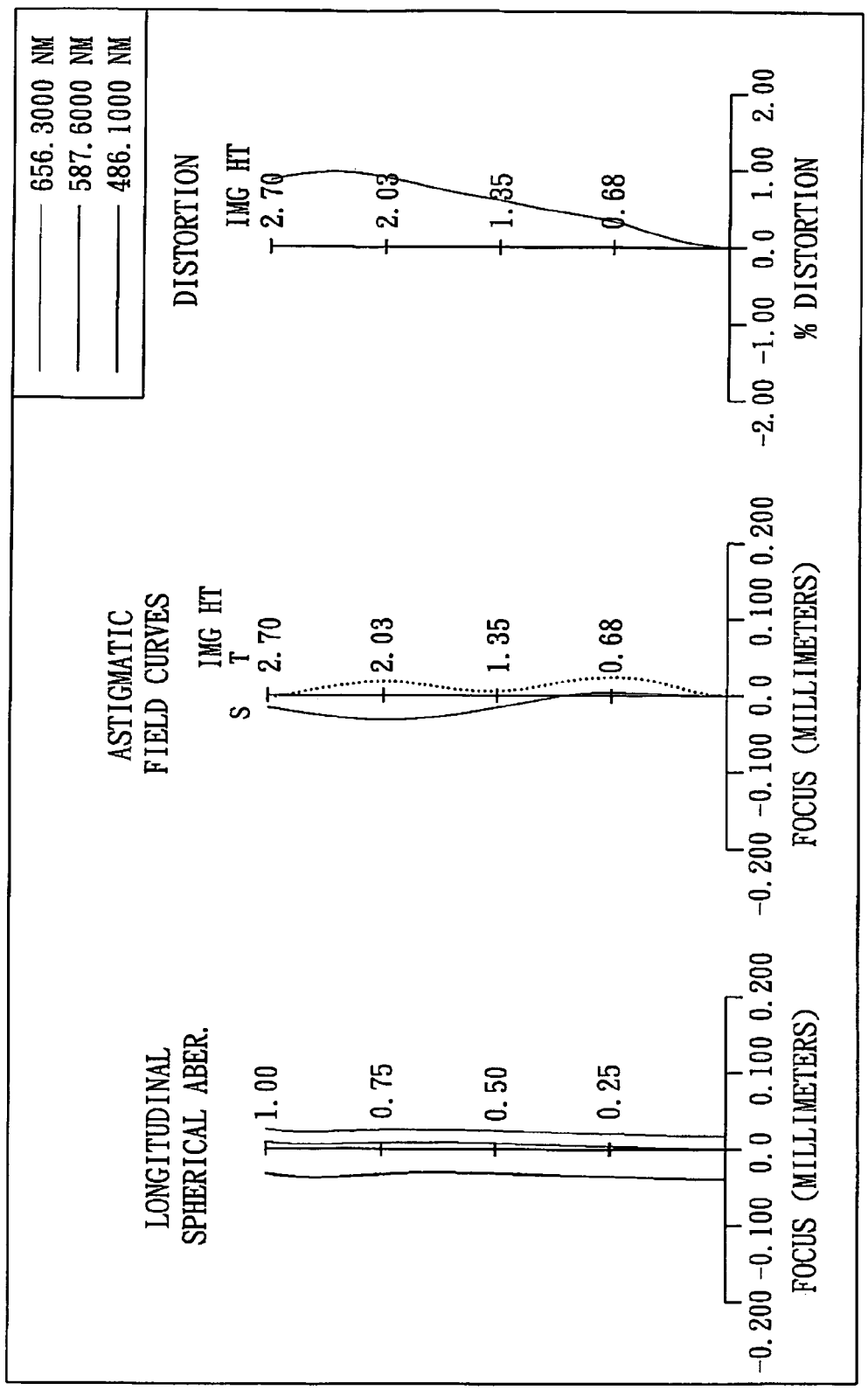
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention comprises: in order from the object side to the image side:

An aperture stop 40.

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a convex image-side surface 32, the object-side surface 31 and the image-side surface 32 are aspheric, and inflection points are formed on the object-side surface 31.

An IR cut filter 50 is located behind the third lens element 30.

An image plane 60 is located behind the IR cut filter 50.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the third lens element is f3, and they satisfy the relations:

$f=4.74$ mm;

$f/f1=1.07$;

$f/f3=1.30$;

$f1/f3=1.21$.

In the second embodiment of the present optical lens system for taking image, the refractive index of the first lens element is N1, the refractive index of the third lens element is N3, and they satisfy the relations:

$N1=1.543$;

$N3=1.530$.

In the second embodiment of the present optical lens system for taking image, the Abbe number of the second lens element is V2, and it satisfies the relation:

$V2=30.2$.

In the second embodiment of the present optical lens system for taking image, the radius of curvature of the object-side surface of the first lens element is R1, the radius of curvature of the image-side surface of the first lens element is R2, and they satisfy the relation:

$R1/R2=0.35$.

In the second embodiment of the present optical lens system for taking image, the radius of curvature of the object-side surface of the third lens element is R5, the radius of curvature of the image-side surface of the third lens element is R6, and they satisfy the relation:

$R5/R6=-0.07$.

In the second embodiment of the present optical lens system for taking image, the center thickness of the second lens element is CT2, the focal length of the optical lens system for taking image is f, and they satisfy the relations:

$CT2=0.350$ mm;

$CT2/f=0.07$.

In the second embodiment of the present optical lens system for taking image, the on-axis distance between the first lens element and the second lens element is T12, the center thickness of the second lens element is CT2, and they satisfy the relation:

$T12/CT2=3.52$.

In the second embodiment of the present optical lens system for taking image, the tangential angle of the image-side-surface of the third lens element at the position of its effective optical diameter is ANG32, and it satisfies the relation:

$ANG32=-37.3$ deg.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the second embodiment of the present optical lens system for taking image, the incident angle of chief rays corresponding to the maximum image height onto the electronic imaging sensor is CRA (Chief Ray Angle), half of the maximal field of view is HFOV, and they satisfy the relation:

$\tan(CRA)/\tan(HFOV)=0.58$.

In the second embodiment of the present optical lens system for taking image, the total track length of the optical lens system for taking image is TTL, the maximum image height of the optical lens system for taking image is ImgH, and they satisfy the relation:

$TTL/ImgH=2.29$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

In the present optical lens system for taking image, the lens elements can be made of glass or plastic. If the lens elements are made of glass, the freedom of distributing the refractive power of the optical lens system will be improved. If the lens elements are made of plastic, the cost will be effectively reduced

TABLE 3

(Embodiment 2)
f (focal lengh) = 4.74 mm, Fno = 2.8, HFOV (half of field of view) = 29.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.238 | | | | |
| 2 | Lens 1 | 1.66577(ASP) | 0.555 | Plastic | 1.543 | 56.5 | 4.42 |
| 3 | | 4.79910(ASP) | 1.231 | | | | |
| 4 | Lens 2 | −0.60364(ASP) | 0.350 | Plastic | 1.583 | 30.2 | −3.48 |
| 5 | | −1.04247(ASP) | 0.070 | | | | |
| 6 | Lens 3 | 2.02422(ASP) | 1.666 | Plastic | 1.530 | 55.8 | 3.64 |
| 7 | | −30.00000(ASP) | 1.000 | | | | |
| 8 | IR-filter | Plano | 0.400 | Glass | 1.517 | 64.2 | |
| 9 | | Plano | 0.921 | | | | |
| 10 | Image | Plano | | | | | |

TABLE 4

Aspheric Coefficients

| | Surface # | | | | | |
|---|---|---|---|---|---|---|
| | 2 | 3 | 4 | 5 | 6 | 7 |
| k = | −5.17244E−01 | 0.00000E+00 | −2.26012E+00 | −1.86288E+00 | +1.82431E+01 | 0.00000E+00 |
| A4 = | 2.52964E−02 | 1.14171E−02 | −2.44404E−01 | −7.06630E−03 | −2.14079E−03 | −1.80402E−02 |
| A6 = | 4.42993E−03 | −4.49221E−03 | 3.03986E−01 | 5.97258E−02 | 1.58843E−06 | 3.53018E−03 |
| A8 = | 6.42781E−03 | | −2.61913E−01 | −8.42393E−03 | −6.10109E−04 | −8.86384E−04 |
| A10 = | | | 1.92148E−01 | 1.11621E−03 | 1.74203E−04 | 5.95181E−05 |
| A12 = | | | −9.27447E−02 | | −1.40959E−05 | 3.69787E−06 |
| A14 = | | | | | | −6.03431E−07 |

TABLE 5

|  | Embodiment 1 | Embodiment 2 |
|---|---|---|
| f | 4.88 | 4.74 |
| Fno | 3.00 | 2.80 |
| HFOV | 29.0 | 29.5 |
| V2 | 23.4 | 30.2 |
| N1 | 1.543 | 1.543 |
| N3 | 1.530 | 1.530 |
| f/f1 | 1.15 | 1.07 |
| f/f3 | 0.75 | 1.30 |
| f1/f3 | 0.65 | 1.21 |
| R1/R2 | 0.34 | 0.35 |
| R5/R6 | −0.07 | −0.07 |
| CT2 | 0.392 | 0.350 |
| CT2/f | 0.08 | 0.07 |
| T12/CT2 | 3.20 | 3.52 |
| TTL/ImgH | 2.29 | 2.29 |
| Tan(CRA)/tan(HFOV) | 0.59 | 0.58 |
| ANG32 | −42.5 | −37.3 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image consisting of three lens elements with refractive power, in order from the object side to the image side:
   an aperture stop;
   a first plastic lens element with positive refractive power having an aspheric convex object-side surface and an aspheric concave image-side surface;
   a second plastic lens element with negative refractive power having an aspheric concave object-side surface and an aspheric convex image-side surface; and
   a third plastic lens element with positive refractive power having an aspheric convex object-side surface and an aspheric convex image-side surface;
   an Abbe number of the second lens element is V2, and it satisfies the relation:

V2<32;

a center thickness of the second lens element is CT2, a focal length of the optical lens system for taking image is f, and they satisfy the relations:

CT2<0.4 mm;

$CT2/f<0.25$.

2. The optical lens system for taking image as claimed in claim 1, wherein inflection points are formed on the object-side of the third lens element.

3. The optical lens system for taking image as claimed in claim 1, wherein the Abbe number of the second lens element is V2, and it satisfies the relation:

V2<28.

4. The optical lens system for taking image as claimed in claim 3, wherein the Abbe number of the second lens element is V2, and it satisfies the relation:

V2<25.

5. The optical lens system for taking image as claimed in claim 1, wherein a refractive index of the first lens element is N1, a refractive index of the third lens element is N3, and they satisfy the relations:

1.54<N1<1.6

1.52<N3<1.6.

6. The optical lens system for taking image as claimed in claim 1, wherein the focal length of the optical lens system for taking image is f, a focal length of the first lens element is f1, and they satisfy the relation:

$0.8<f/f1<1.5$.

7. The optical lens system for taking image as claimed in claim 6, wherein the focal length of the optical lens system for taking image is f, the focal length of the first lens element is f1 and they satisfy the relation:

$0.9<f/f1<1.25$.

8. The optical lens system for taking image as claimed in claim 7, wherein the focal length of the optical lens system for taking image is f, a focal length of the third lens element is f3, and they satisfy the relation:

$0.5<f/f3<1.5$.

9. The optical lens system for taking image as claimed in claim 8, wherein the focal length of the optical lens system for taking image is f, the focal length of the third lens element is f3, and they satisfy the relation:

$1.0<f/f3<1.45$.

10. The optical lens system for taking image as claimed in claim 1, wherein a focal length of the first lens element is f1, a focal length of the third lens element is f3, and they satisfy the relation:

$1.0<f1/f3<1.5$.

11. The optical lens system for taking image as claimed in claim 1, wherein a focal length of the first lens element is f1, a focal length of the third lens element is f3, and they satisfy the relation:

$1.0<f1/f3<1.5$.

12. An optical lens system for taking image consisting of three lens elements with refractive power, in order from the object side to the image side:
    an aperture stop;
    a first lens element with positive refractive power having a convex object-side surface and a concave image-side surface;
    a second lens element with negative refractive power having a concave object-side surface and a convex image-side surface, at least one of the object-side and the image-side surfaces of the second lens element being aspheric; and
    a third lens element with positive refractive power having a convex object-side surface and a convex image-side surface, at least one of the object-side and the image-side surfaces of the third lens element being aspheric;
    an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<2.35$.

13. An optical lens system for taking image consisting of three lens elements with refractive power, in order from the object side to the image side:
- an aperture stop;
- a first lens element with positive refractive power having a convex object-side surface and a concave image-side surface;
- a second lens element with negative refractive power having a concave object-side surface and a convex image-side surface, at least one of the object-side and the image-side surfaces of the second lens element being aspheric; and
- a third lens element with positive refractive power having a convex object-side surface and a convex image-side surface, at least one of the object-side and the image-side surfaces of the third lens element being aspheric;
- wherein an on-axis distance between the first lens element and the second lens element is T12, a center thickness of the second lens element is CT2, and they satisfy the relation:

$1.5 < T12/CT2 < 4.0.$

14. An optical lens system for taking image consisting of three lens elements with refractive power, in order from the object side to the image side:
- an aperture stop;
- a first plastic lens element with positive refractive power having an aspheric convex object-side surface and an aspheric concave image-side surface;
- a second plastic lens element with negative refractive power having an aspheric concave object-side surface and an aspheric convex image-side surface; and
- a third plastic lens element with positive refractive power having an aspheric convex object-side surface and an aspheric convex image-side surface;
- wherein an on-axis distance between the first lens element and the second lens element is T12, a center thickness of the second lens element is CT2, and they satisfy the relation:

$2.5 < T12/CT2 < 4.0.$

15. An optical lens system for taking image consisting of three lens elements with refractive power, in order from the object side to the image side:
- an aperture stop;
- a first lens element with positive refractive power having a convex object-side surface and a concave image-side surface;
- a second lens element with negative refractive power having a concave object-side surface and a convex image-side surface, at least one of the object-side and the image-side surfaces of the second lens element being aspheric; and
- a third lens element with positive refractive power having a convex object-side surface and a convex image-side surface, at least one of the object-side and the image-side surfaces of the third lens element being aspheric;
- wherein an incident angle of chief rays corresponding to the maximum image height onto the electronic imaging sensor is CRA (Chief Ray Angle), a half of a maximal field of view is HFOV, and they satisfy the relation:

$0.5 < \tan(CRA)/\tan(HFOV) < 1.15.$

16. An optical lens system for taking image consisting of three lens elements with refractive power, in order from the object side to the image side:
- an aperture stop;
- a first plastic lens element with positive refractive power having an aspheric convex object-side surface and an aspheric concave image-side surface;
- a second plastic lens element with negative refractive power having an aspheric concave object-side surface and an aspheric convex image-side surface; and
- a third plastic lens element with positive refractive power having an aspheric convex object-side surface and an aspheric convex image-side surface;
- an Abbe number of the second lens element is V2, and it satisfies the relation:

$V2 < 32;$

- wherein a radius of curvature of the object-side surface of the first lens element is R1, a radius of curvature of the image-side surface of the first lens element is R2, a radius of curvature of the object-side surface of the third lens element is R5, a radius of curvature of the image-side surface of the third lens element is R6, and they satisfy the relations:

$0.1 < R1/R2 < 0.5;$ $-0.15 < R5/R6 < -0.01.$

17. An optical lens system for taking image consisting of three lens elements with refractive power, in order from the object side to the image side:
- an aperture stop;
- a first plastic lens element with positive refractive power having an aspheric convex object-side surface and an aspheric concave image-side surface;
- a second plastic lens element with negative refractive power having an aspheric concave object-side surface and an aspheric convex image-side surface; and
- a third plastic lens element with positive refractive power having an aspheric convex object-side surface and an aspheric convex image-side surface;
- an Abbe number of the second lens element is V2, and it satisfies the relation:

$V2 < 32;$

- wherein a tangential angle of the image-side surface of the third lens element at the position of its effective optical diameter is ANG32, and it satisfies the relation:

$ANG32 < -20 \text{ deg}.$

* * * * *